United States Patent
Lin (10) Patent No.: US 6,957,526 B1
(45) Date of Patent: Oct. 25, 2005

(54) PRESSURE-ACTUATED TOY ROCKET SYSTEM

(76) Inventor: Chitsan Lin, 142 Hai-Chuan Road, Nan-Tzu District, Kaohsiung (TW)

( * ) Notice: Subject to any disclaimer, the term of this patent is extended or adjusted under 35 U.S.C. 154(b) by 0 days.

(21) Appl. No.: 10/890,957

(22) Filed: Jul. 14, 2004

(51) Int. Cl.$^7$ .............................................. B63H 11/00
(52) U.S. Cl. ............................ 60/221; 60/205; 60/219; 446/52; 446/56
(58) Field of Search ................................ 60/221, 200.1, 60/251, 257, 258, 204, 205, 219; 446/52, 446/331, 56, 211, 212; 89/1.801, 1.813; 244/122 AD; 102/347, 287; 124/57; 215/360; D21/452

(56) References Cited

U.S. PATENT DOCUMENTS

| | | | | |
|---|---|---|---|---|
| 2,588,184 A | * | 3/1952 | Walsh | 446/212 |
| 2,733,699 A | * | 2/1956 | Krinsky | 124/69 |
| 2,759,297 A | * | 8/1956 | Lewis | 446/212 |
| 2,918,751 A | * | 12/1959 | Johnson | 89/1.806 |
| 2,927,398 A | * | 3/1960 | Joseph et al. | 446/212 |
| 3,046,694 A | * | 7/1962 | Holderer | 446/212 |
| 3,091,052 A | * | 5/1963 | Ryan | 446/212 |
| 3,962,818 A | * | 6/1976 | Pippin, Jr. | 446/212 |
| 4,076,006 A | * | 2/1978 | Breslow et al. | 124/64 |
| 4,779,534 A | * | 10/1988 | Wang | 102/334 |
| 5,188,557 A | * | 2/1993 | Brown | 446/212 |
| 5,415,153 A | * | 5/1995 | Johnson et al. | 124/63 |
| 5,839,940 A | * | 11/1998 | Ensmenger | 446/212 |
| 5,881,706 A | * | 3/1999 | Carson | 124/69 |
| 6,315,629 B1 | * | 11/2001 | Jones | 446/212 |
| 6,568,170 B1 | * | 5/2003 | Rives | 60/221 |
| 6,752,682 B1 | * | 6/2004 | Ferrell | 446/230 |
| 6,779,459 B2 | * | 8/2004 | Werner | 102/349 |
| 6,808,436 B1 | * | 10/2004 | Siu | 446/231 |
| 2003/0194943 A1 | * | 10/2003 | Rowley et al. | 446/52 |
| 2005/0009440 A1 | * | 1/2005 | Foster et al. | 446/231 |
| 2005/0115220 A1 | * | 6/2005 | Mo | 60/221 |

\* cited by examiner

Primary Examiner—William H. Rodriguez
(74) Attorney, Agent, or Firm—Pro-Techtor Int'l Services (57) ABSTRACT

A pressure-actuated rocket system comprises a bottom base, a detonator and a rocket body. A top base is placed on a top surface of the bottom base. At least one through hole is located on a side of the top base and extended to an opening of the top surface. The hollow detonator has a closed and an opened ends. The rocket body is a bottle with fins. After soda powder is placed inside the detonator and vinegar is filled into the rocket body, the bottom base, the detonator and the rocket body are held inclined. The openings are aimed at the inclined bottom base in turn, the pressure-actuated rocket system is then turned upside down. Soda powder subsequently falls and reacts with vinegar, and gas is generated. A pressure accumulates inside the rocket body until it is high enough to shoot the rocket body up.

22 Claims, 8 Drawing Sheets

FIG. 9

PRESSURE-ACTUATED TOY ROCKET SYSTEM

FIELD OF THE INVENTION

The present invention relates to a pressure-actuated rocket system, and more particularly, to a pressure-actuated rocket system with security, firmness, and environmental protection.

BACKGROUND OF THE INVENTION

It is an ancient custom that firecrackers are shot off on celebrations and festivals in China. Afterwards, Chinese rockets are available in the market. However, it is worried that the fireworks may explode so that be limited in use.

Figure 1:
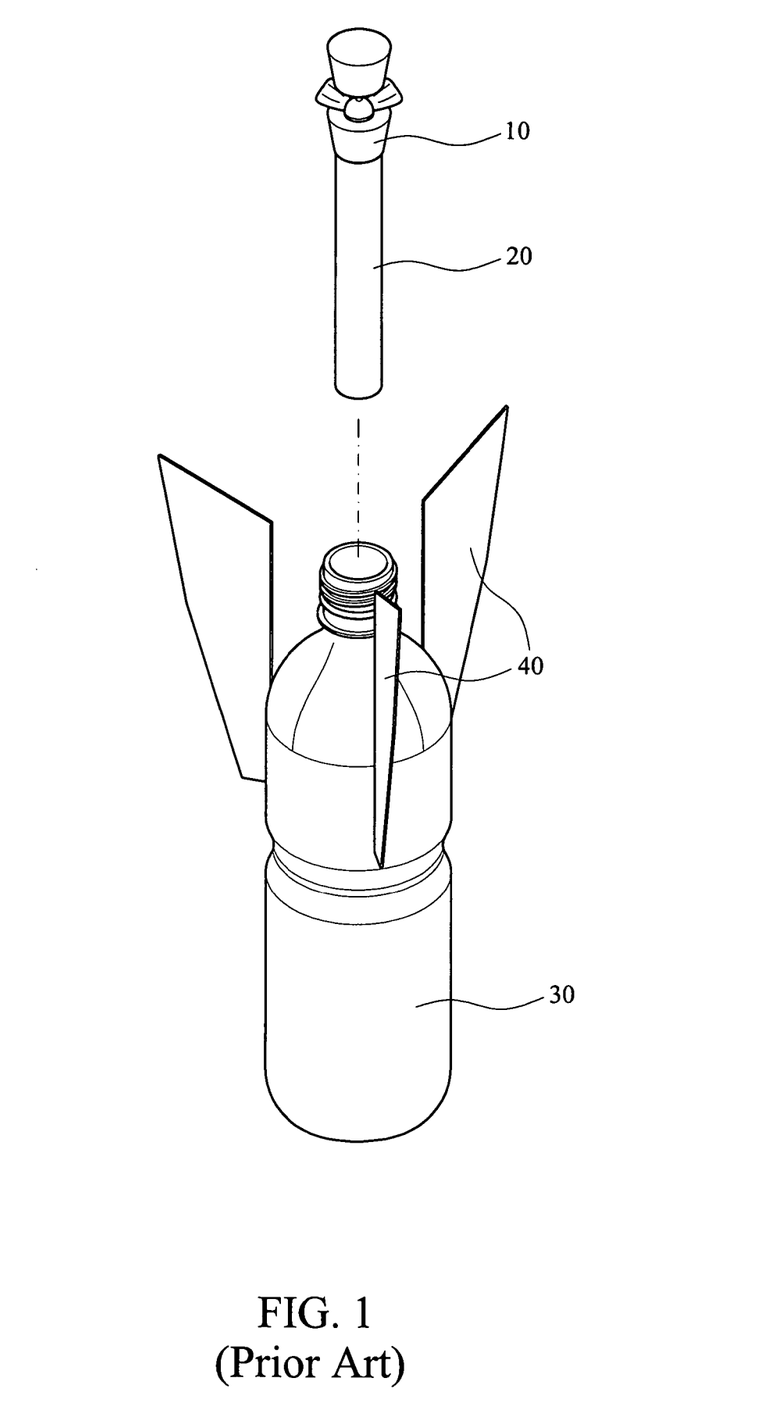
FIG. 1 depicts an exploded diagram of the rocket with high pressure fueling module in the prior art.

Reference is made to FIG. 1, which depicts an exploded diagram of the rocket with high pressure fueling module in the prior art. The rocket with high pressure fueling module has similar shooting effect. Soda powder and vinegar react to generate gas, for example, carbon dioxide, and pressure builds up inside the bottle until it is high enough to shoot the bottle up into the sky. It is provided with a shooting effect similar to Chinese rockets and educational meanings. The rocket with high pressure fueling module in the prior art comprises a detonator 20 with one end closed by a rubber stopper 10, and a rocket body 30. The detonator 20 is hollow with one end closed by a rubber stopper 10 and an opened end. The rocket body 30 is a bottle with an opening on a top and three rear fins 40 fixed around the top and separated from each other by the same distance. The rear fins 40 are protruded over the opening of the rocket body 30.

Figure 2:
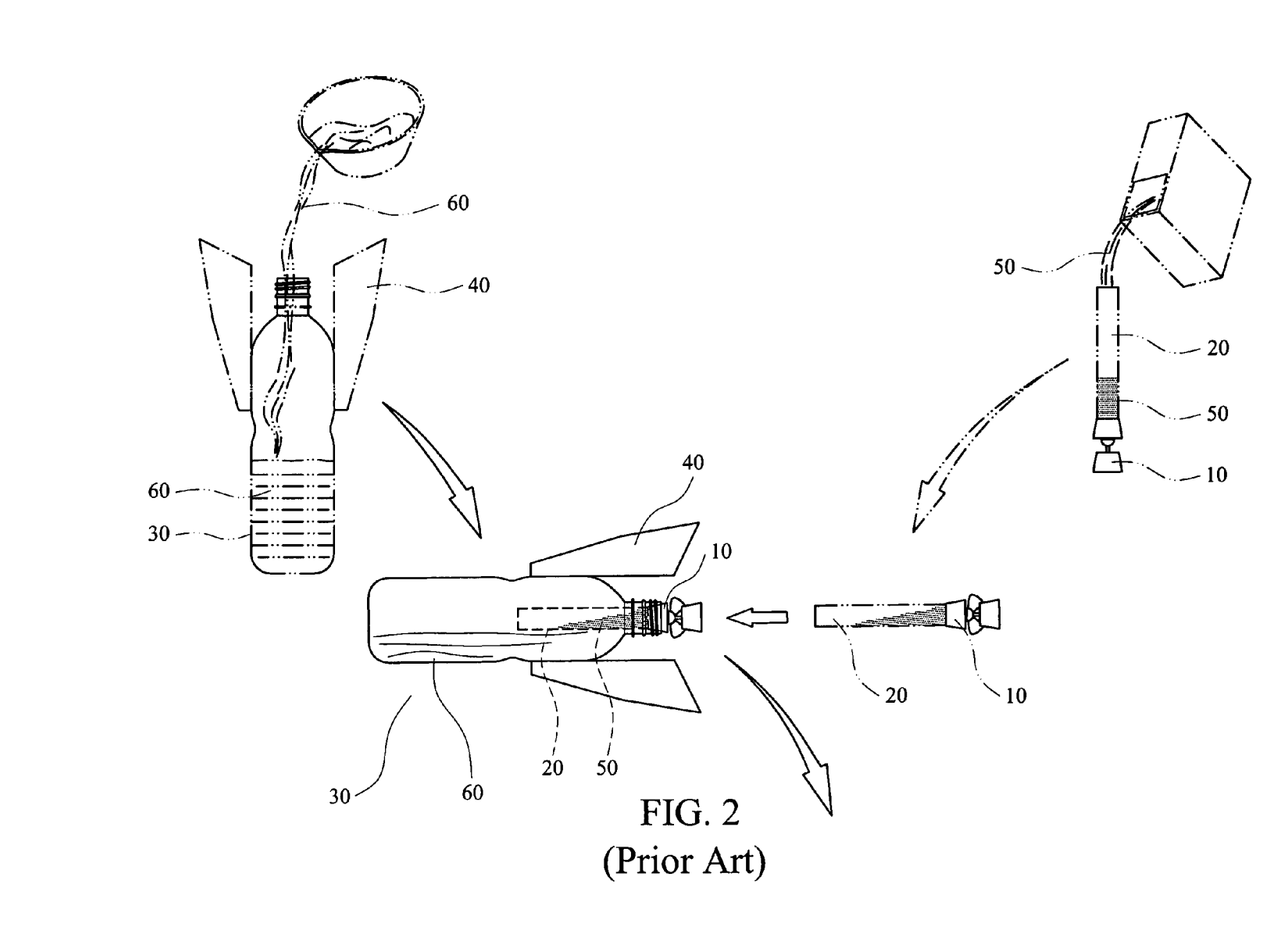
FIGS. 2 to 3 depict an assembling process of the rocket with high pressure fueling module in the prior art.
Figure 3:
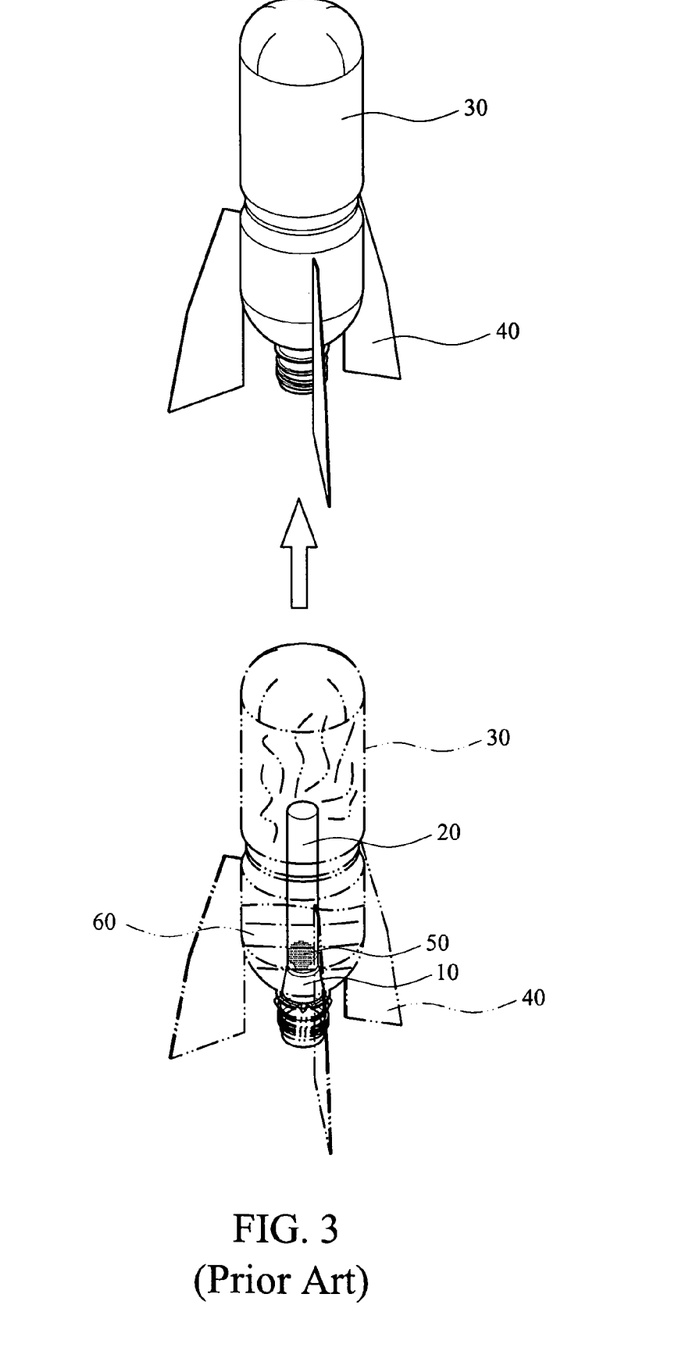

Reference is made to FIGS. 2 to 3, which depict an assembling process of the rocket with high pressure fueling module in the prior art. During assembling, soda powder 50 is placed inside the detonator 20 and vinegar 60 is filled into the rocket body 30 as shown in FIG. 2. Subsequently, the opening of the detonator 20 are held inclined to insert into the rocket body 30 until the rubber stopper 10 is tightly close on the opening and assembled in a closed state. The inclined angle is not limited but avoided pouring soda powder 50 and vinegar 60 out.

When shooting the rocket body 30, the rocket with high pressure fueling module is turned upside down, so that the opening of the rocket body 30 is up but the opening of the detonator 20 is down, so as to mix soda powder 50 and vinegar 60 and start a chemical reaction, as shown in FIG. 3. At this time, the rocket with high pressure fueling module must be quickly turned upside down, and the fins 40 support and position the inverted rocket with high pressure fueling module on the ground. Therefore, a length of the fins must be more than a height that includes the opening of the rocket body 30 and the rubber stopper 10 tightly close thereon, so as to position the rocket body 30. In addition, after completion of turning the rocket upside down, a pressure has accumulated in a period, so it is possible to shoot the rocket body 30 up into the sky in any time. The rear fins 40 serve to guide an air flow and balance the rocket body 30 up.

In brief, the rocket with high pressure fueling module in the prior art, which is a scientific toy, utilizes a mechanism to control the release of the gas formed by the chemical reaction, and provides educational meanings. However, there are some drawbacks existed in the rocket in the prior art, such as instability, fragile rear fins, restricted operating time, difficult to position and so on. These drawbacks in details are discussed as follows.

The bottom base is instable due to relatively raising center-of-gravity position after turning the rocket upside down. Moreover, the rocket body is lighter for shooting higher, so the rear fins are also very light. The whole rocket with high pressure fueling module is instable for weak supporting force of three light rear fins.

The rear fins must be high enough to avoid the rubber stopper to hold on the ground. Thus, the length of the rear fins must be very long but fragile to break or deform during operation.

The operating time is so restricted that a risk easily happens. When the detonator inserts into the rocket body, soda powder and vinegar starts to react immediately. After the rubber stopper tightly close on the opening of the rocket body and completion of turned the rocket upside down, a pressure has accumulated in a period, so it is possible to shoot the rocket body up into the sky in any time. However, if the operation is too slow, the rocket body may be shot up before completion of turned the rocket upside down, and the rocket body may be dangerous to rush to the user's face or onlookers.

The rear fins are difficult to position by three-point supporting. It must be very careful to turn the rocket upside down to keep the rocket stably positioning on the ground, otherwise the rocket may be possible to fall down. As such for the restricted operating time, it is very difficult to quickly stabilize the rocket with high pressure fueling module.

SUMMARY OF THE INVENTION

According to the above description, for preventing a chemical reaction happening simultaneously with combining the detonator and the rocket body in the prior art, it is an aspect of the present invention to provide a pressure-actuated rocket system. A detonator and a rocket body of the pressure-actuated rocket system are designed to insert together in the same direction. Soda powder and vinegar are separated from each other during combining the detonator and the rocket body, so as to prevent soda powder and vinegar from reacting with each other to generate a gas. An outlet for soda powder is designed to be adjustable in size, so as to accelerate or decelerate a speed of gas accumulation. A bottom base is employed to support the whole pressure-actuated rocket system for preventing unstable placing while turning the pressure-actuated rocket system upside down, and a downside of the bottom base is placed down for contacting with a ground for increasing stable supporting. The bottom base is a solid or a container. When the bottom base is a container, a solid or liquid substance may be placed in the bottom base for increasing stability. Therefore, the present invention improves the issues existed in the pressure-actuated rocket system of the prior art. In addition, the outlet for soda powder is adjustable in size, so as to control a time between initial accumulation of gas and a pressure high enough to shoot the rocket body. As a result, there is more enough time to insert and assemble the pressure-actuated rocket system, and then a risk is reduced.

Moreover, for satisfying the requirement of environmental protection, the bottom and the rocket body of the pressure-actuated rocket system may be a do-it-yourself (DIY) toy, which is made by modifying a polyethylene terephthalate (PET) bottle, and take in conjunction with soda powder and vinegar available on hand. The pressure-actuated rocket system further provides a scientific experiment and educational meaning.

According to the aforementioned aspect of the present invention, there is provided a pressure-actuated rocket system, which comprises a bottom base, a detonator and a rocket body. A top base is placed on a top surface of the bottom base, and at least one through hole is located on a side of the top base and extended to an opening of the top surface. The detonator is hollow with a closed end, an opened end, and an inner portion for placing soda powder. The rocket body is a bottle for filling vinegar into thereof, and having several fins fixed on an outer side thereof with separating from each other by the same distance. During operating the pressure-actuated rocket system, after soda powder is placed inside the detonator and vinegar is filled into the rocket body, the opening of the detonator is aimed at the through hole of the top base of the bottom base well, and the detonator and the rocket body are inclined and inserted together. The detonator may either be inserted into the through hole of the top base or covers thereof. A desired reaction time for the rocky body to shoot up depends on a size of the through hole partially covered with the detonator. After assembling the detonator and the top base of the bottom base, the rocket body starts to cover the closed end of the detonator in a tile angle, wherein both open ends of the rocket body and the detonator are placed in the same direction. The rocket body continues to cover the detonator and the through hole of the top base completely, followed by fixing the rocket body outside the top base of the bottom base, and then, completing preparation for shooting. While shooting, the whole pressure-actuated rocket system is turned upside down, so that the bottom base is placed on the ground. Subsequently, soda powder falls and reacts with vinegar via the through hole of the top base, and gas is generated inside the rocket body. A pressure accumulates inside the rocket body until it is high enough to shoot the rocket body up into the sky. The bottom base is a solid or a container. When the bottom base is a container, the bottom base and the top base are separated from each other. Water or quartz sands may be filled inside the bottom base for increasing weight, and the bottom base is then assembled with the top base in a closed type. A modified PET bottle may be provided for the bottom base and the rocket body.

The object of the pressure-actuated rocket system of the present invention is to increase security and firmness. Therefore, the object is performed by delaying the time of the chemical reaction, providing enough time to assemble the pressure-actuated rocket system, and contacting the bottom base on the ground with a large area to increase security for placing and positioning. Moreover, the speed of pressure accumulation is adjustable.

Accordingly, advantages over the pressure-actuated rocket system of the present invention include better stability, durable fins, more operating time, easy to position, controllable chemical reaction time, environmental protection, decorative effect and so on. These advantages in details are discussed as follows.

The bottom base is provided better stability by supporting the whole pressure-actuated rocket system, lowering center-of-gravity position, having weight, and additionally, avoiding rear fins to lift the whole pressure-actuated rocket system.

The fins serve to generate an air flow for guiding and balancing the rocket body, so the fins of the present invention are durable, short and light enough to function as above and prevent themselves from contacting with the ground, as well as lighten the weight of the rocket body for increasing a shooting height, whereby improving drawbacks of the prior fins and preventing the fins from breaking.

The operating time is more enough to place the whole pressure-actuated rocket system well and stably, due to the chemical reaction delayed, which results from the detonator and the rocket body are placed in the same direction, and the chemical reaction of soda powder and vinegar is initiated by turning the whole pressure-actuated rocket system upside down, whereby increasing security.

The whole pressure-actuated rocket system is easy to position by using the weighted bottom base for supporting thereof and placing the bottom base on the ground while turning the whole pressure-actuated rocket system upside down, whereby increasing stability.

The chemical reaction time can be controlled by adjusting a size of the through hole of the top base covered with the detonator, so as to determine to accelerate or decelerate the chemical reaction. Therefore, there is provided with security during operation.

The bottom base and the rocket body of the present invention is manufactured by utilizing a recycled PET bottle, for satisfying the spirit of environmental protection, such as waste recycling.

A transparent container may be used as the bottom base, and such container can be partially filled with colorful quartz sands for providing a decorative effect. During operation, the quartz sands generate a shake and flow in the bottom base for pleasing to the eyes and increasing economic benefits.

BRIEF DESCRIPTION OF THE DRAWINGS

The foregoing aspects and many of the attendant advantages of this invention will become more readily appreciated and better understood by reference to the following detailed description, when taken in conjunction with the accompanying drawings, wherein.

DETAILED DESCRIPTION OF THE PREFERRED EMBODIMENT

The present invention provides a pressure-actuated rocket system and a method of operating the same. The following description of embodiments of the present invention is illustrated in details by accompanying FIGS. 4 to 9.

Figure 4:
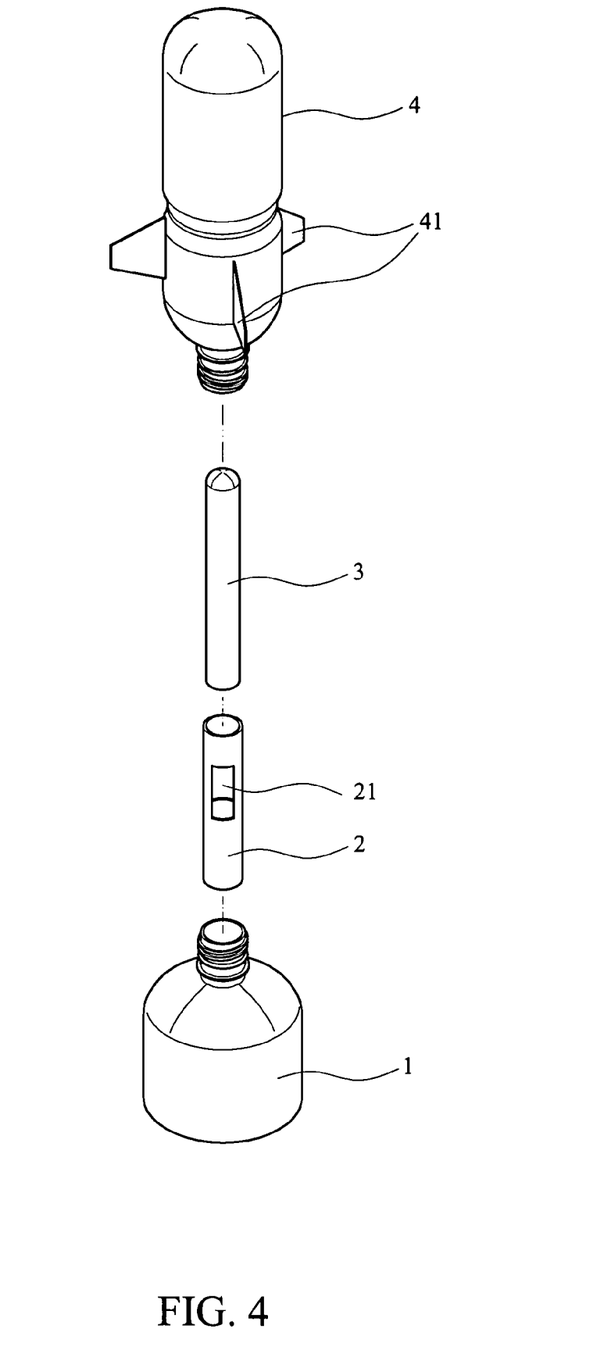
FIG. 4 depicts an exploded diagram of the pressure-actuated rocket system according to a preferred embodiment of the invention.

Reference is made to FIG. 4, which depicts an exploded diagram of the pressure-actuated rocket system according to a preferred embodiment of the invention. The pressure-actuated rocket system comprises a bottom base 1, a top base 2, a detonator 3 and a rocket body 4.

Figure 5:
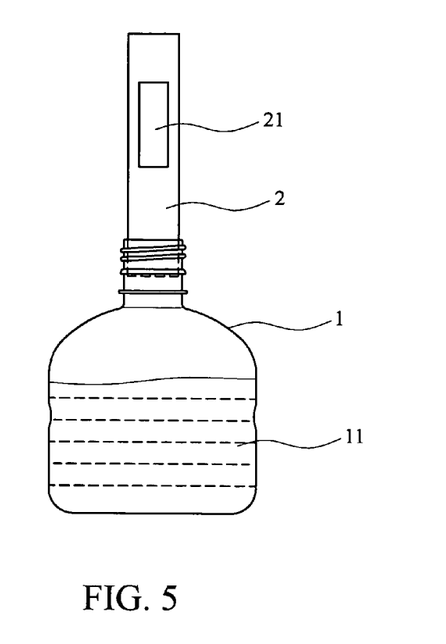
FIG. 5 depicts a diagram of the bottom base and the top base according to a preferred embodiment of the invention.

Reference is made to FIG. 5, which depicts a diagram of the bottom base and the top base according to a preferred embodiment of the invention. The bottom base 1 is a container for filling water 11 or quartz sands (not shown) therein to increase weight and a decorative effect. An opening is located on a top surface of the top base 2, and a through hole 21 is located on a side of the top base 2 and extended to the opening of the top surface. A downside of the top base 2 is fixed on a top of the bottom base 1 in a closed type.

Reference is made to FIG. 4 again, the detonator 3 is hollow with a closed end, and an opened end facing the opening on the top base 2 for inserting thereof, and an inner portion for placing soda powder 5.

The rocket body 4, as shown in FIG. 4, is a bottle for filling vinegar 6 into, and having three fins 41 fixed on an outer side with separating from each other by the same distance. An opened end of the rocket body 4 covers the top base 2 tightly.

Figure 6:
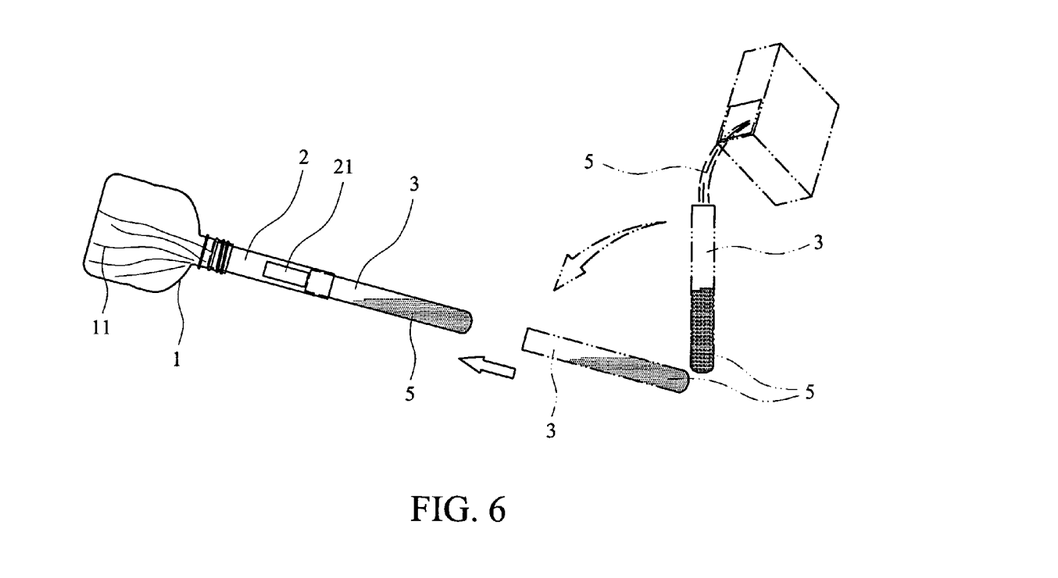
FIGS. 6 to 7 depict an assembling process of the pressure-actuated rocket system according to a preferred embodiment of the invention.
Figure 7:
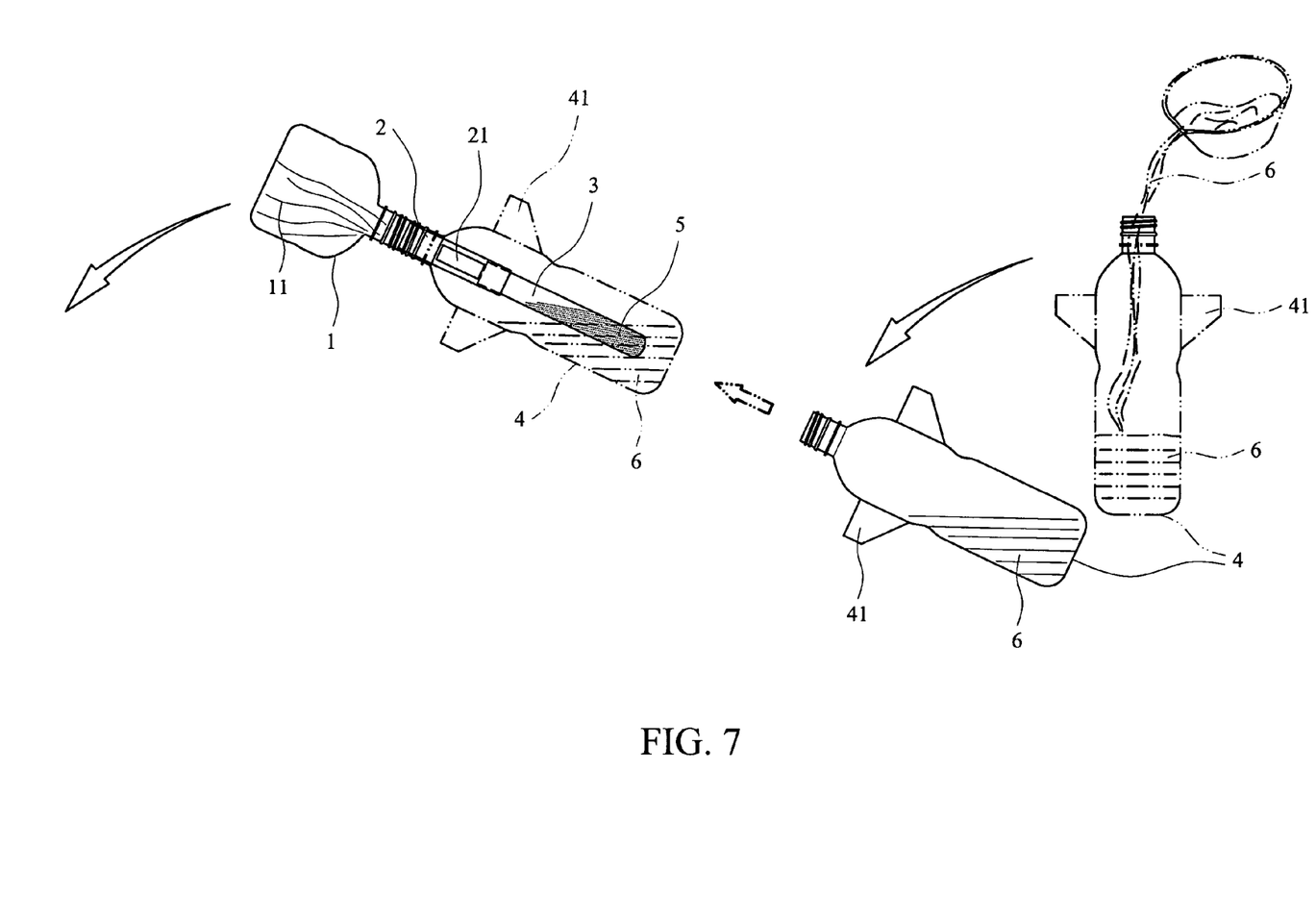
Figure 9:
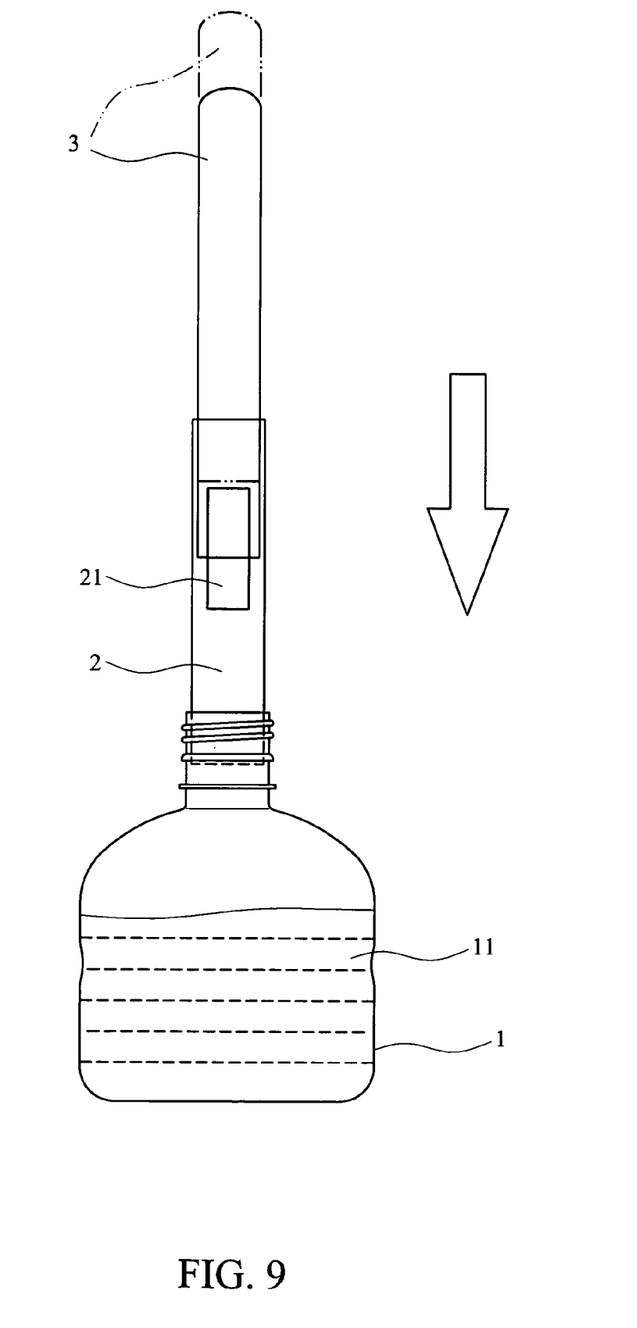
FIG. 9 depicts an operational diagram of the bottom base and the top base according to a preferred embodiment of the invention.

Reference is made to FIGS. 6 to 7, which depict an assembling process of the pressure-actuated rocket system according to a preferred embodiment of the invention. During assembling, soda powder 5 is placed inside the detonator 3 as shown in FIG. 6. Subsequently, the top base 2 and the detonator 3 are held inclined in the same direction, and the opened end of the detonator 3 faces the opening of the top base 2, whereby inserting the detonator 3 into the opening of the top base 2 in a depth. Reference is made to FIG. 9, which depicts an operational diagram of the bottom base and the top base according to a preferred embodiment of the invention. Depending on the desired time, the depth is adjustable for covering the through hole partially, as shown in FIG. 9.

Vinegar 6 is filled into the rocket body 4 as shown in FIG. 7. The opening of the rocket body 4 faces the opening of the top base 2 and has the same direction with the detonator 3. The rocket body 4 is inclined corresponding to the top base 2, and the opening of the rocket body 4 starts to cover the closed end of the detonator, and continues to cover the detonator 3 and the through hole 21 of the top base 2 completely, followed by fixing the rocket body 4 outside the top base 2 tightly.

Figure 8:
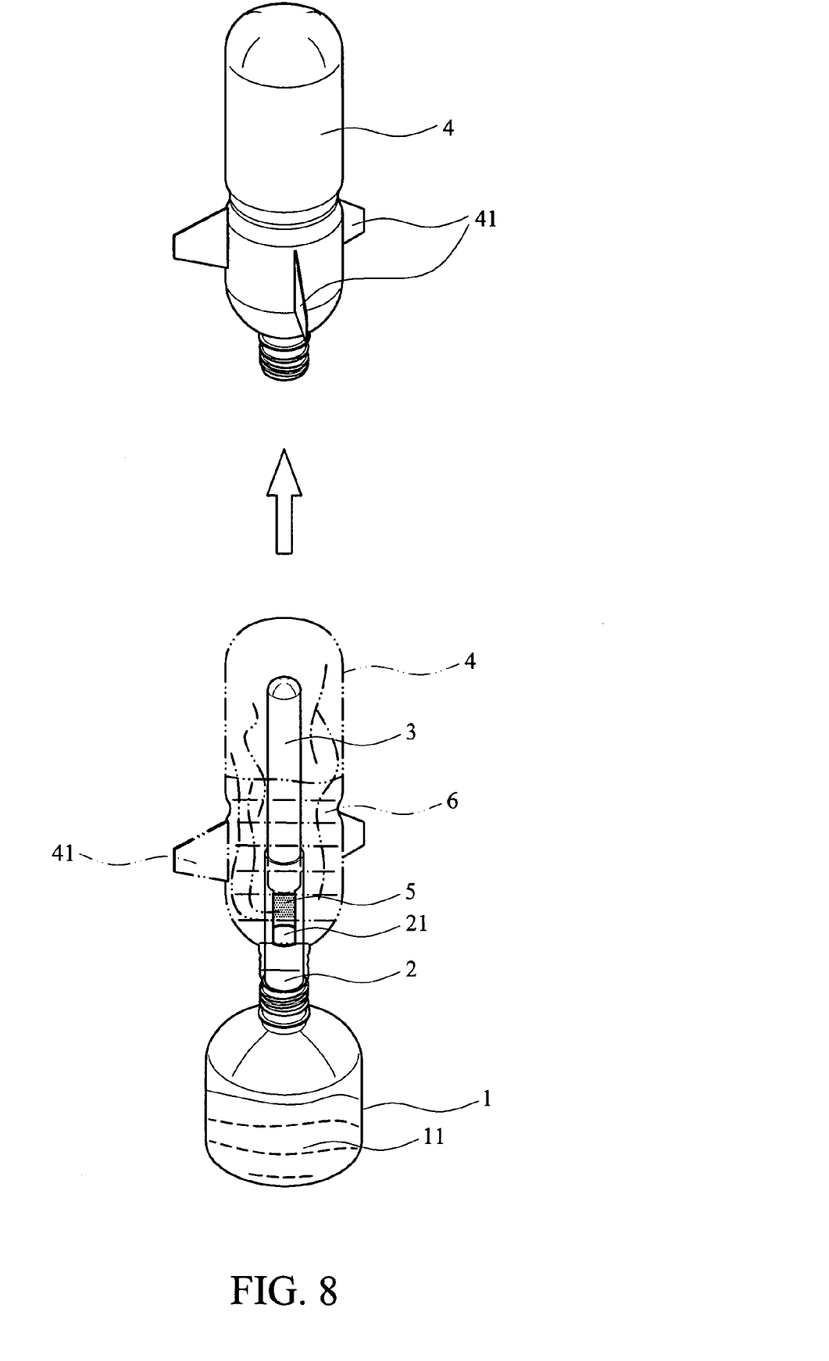
FIG. 8 depicts an operational diagram of the pressure-actuated rocket system during shooting up according to a preferred embodiment of the invention.

When shooting the rocky body 4, the whole pressure-actuated rocket system is turned upside down, so that the bottom base 1 is placed on the ground, as shown in FIG. 8. At the same time, soda powder 5 falls and reacts with vinegar 6 via the through hole 21 of the top base 2, and gas is generated inside the rocket body 4. A pressure accumulates inside the rocket body 4 until it is high enough to shoot the rocket body 4 up into the sky. The fins 41 of the rocket body 4 serve to balance the rocket body 4, so at least three fins 41 are separated from each other by the same distance.

As the above discussion, the bottom base 1 may be a molded solid with the top base 2. The through hole 21 of the top base 2 may be one or more, or one of through one or two sides thereof. The detonator 3 may insert into or cover the top base 2. The fins 41 of the rocket body 4 serve to guide an air flow for balancing the rocket body 4, alternatively, the rocket body 4 without fins can also be shot by pressure. Moreover, the bottom base 1 and the rocket body 4 is manufactured by modifying a waste PET bottle, for reducing the waste production and satisfying the spirit of environmental protection.

The present invention utilizes a chemical reaction of soda powder 5 and vinegar 6 to generate a gas. A pressure accumulates inside the rocket body until it is high enough to shoot the rocket body up into the sky. Therefore, according to the aforementioned preferred embodiments, one advantage of the pressure-actuated rocket system of the present invention is to provide a result of scientific experiment, as well as physical and chemical educational meanings. Moreover, the bottom base and the rocket body of the present invention is manufactured by utilizing a recycled PET bottle, for satisfying the spirit of environmental protection.

In addition, another advantage of the pressure-actuated rocket system of the present invention, is to cover the detonator and the rocket body in the same direction, followed by turning the pressure-actuated rocket system upside down, and flowing soda powder slowly out of the through hole. Soda powder reacts with vinegar under a controllable condition. In other words, the size of the through hole is adjusted by a depth for inserting the detonator into the opening of the top base, and the time for shooting by accumulating the enough pressure is adjustable. Therefore, a risk of operation is greatly reduced.

In addition, a further advantage of the pressure-actuated rocket system of the present invention, is to fill water or colorful quartz sands in the bottom base for increasing weight. The quartz sands are partially filled in a transparent container for providing a decorative effect and novelty during flowing.

In addition, a still another advantage of the bottom base of the present invention, is to provide better stability by contacting with the ground in a large area. While an excessively great pressure bursts to shoot the rocket body, the bottom base is still stable to support the whole pressure-actuated rocket system and bear such pressure, instead of shifting or falling down. Therefore, the rocket can levitate straightly and stably. Furthermore, the pressure-actuated rocket system of the present invention satisfies the spirit of environmental protection, and has security, firmness, and better effect.

As is understood by a person skilled in the art, the foregoing preferred embodiments of the present invention are illustrated of the present invention rather than limiting of the present invention. It is intended to cover various modifications and similar arrangements included within the spirit and scope of the appended claims. Therefore, the scope of which should be accorded the broadest interpretation so as to encompass all such modifications and similar structure.

What is claimed is:

1. A pressure-actuated rocket system comprising:
    a bottom base, wherein a top base is placed on a top surface of the bottom base, and at least one through hole is located on a side of the top base and extended to an opening of the top surface;
    a detonator, which is hollow with a closed end, an opened end, and an inner portion for placing soda powder, wherein the opened end of the detonator faces the bottom base and is inserted into the opening of the top base, whereby connecting the detonator to outside via the through hole of the top base; and
    a rocket body, which is a bottle for filling vinegar into thereof, wherein an opening of the rocket body covers the closed end of the detonator, the detonator and the through hole of the top base of the bottom base, followed by fixing the rocket body outside the top base of the bottom base tightly.

2. The pressure-actuated rocket system according to claim 1, wherein the detonator inserts into the opening of the top base of the bottom base in a depth, and the depth is adjustable for covering the through hole partially.

3. The pressure-actuated rocket system according to claim 1, wherein the bottom base is a solid.

4. The pressure-actuated rocket system according to claim 1, wherein a downside of the bottom base is placed down for contacting with a ground.

5. The pressure-actuated rocket system according to claim 1, wherein the rocket body is made from a polyethylene terephthalate (PET) bottle.

6. The pressure-actuated rocket system according to claim 1, wherein the through hole of the top base of the bottom base penetrates two sides of the top base.

7. A pressure-actuated rocket system comprising:
a bottom base, wherein a top base is placed on a top surface of the bottom base, and at least one through hole is located on a side of the top base and extended to an opening of the top surface;
a detonator, which is hollow with a closed end, an opened end, and an inner portion for placing soda powder, wherein the opened end of the detonator faces the bottom base and covers outside the top base of the bottom base, whereby connecting the detonator to outside via the through hole of the top base; and
a rocket body, which is a bottle for filling vinegar into thereof and having a plurality of fins fixed on an outer side thereof, wherein an opening of the rocket body covers the closed end of the detonator, the detonator and the through hole of the top base of the bottom base, followed by fixing the rocket body outside the top base of the bottom base tightly.

8. The pressure-actuated rocket system according to claim 7, wherein at least three fins are fixed on the outer side of the rocket body and separated from each other by the same distance.

9. The pressure-actuated rocket system according to claim 7, wherein the detonator inserts into the opening of the top base of the bottom base for partially covering the through hole.

10. The pressure-actuated rocket system according to claim 7, wherein the bottom base is a solid.

11. The pressure-actuated rocket system according to claim 7, wherein a downside of the bottom base is placed down for contacting with a ground.

12. The pressure-actuated rocket system according to claim 7, wherein the rocket body is made from a PET bottle.

13. The pressure-actuated rocket system according to claim 7, wherein the through hole of the top base of the bottom base penetrates two sides of the top base.

14. A pressure-actuated rocket system comprising:
a bottom base that is a container;
a top base having at least one through hole located on a side of the top base, an opening located on a top of the top base and extended to the through hole, and a bottom surface fixed on the bottom base in a closed type;
a detonator, which is hollow with a closed end, an opened end, and an inner portion for placing soda powder, wherein the opened end of the detonator faces the opening of the top base and is inserted into thereof, whereby connecting the detonator to outside via the through hole of the top base; and
a rocket body, which is a bottle for filling vinegar into thereof and having a plurality of fins fixed on an outer side thereof, wherein an opening of the rocket body covers the closed end of the detonator, the detonator and the through hole of the top base, followed by fixing the rocket body outside the top base of the bottom base tightly.

15. The pressure-actuated rocket system according to claim 14, wherein at least three fins are fixed on the outer side of the rocket body and separated from each other by the same distance.

16. The pressure-actuated rocket system according to claim 14, wherein the detonator inserts into the opening of the top base for partially covering the through hole.

17. The pressure-actuated rocket system according to claim 14, wherein a downside of the bottom base is placed down for contacting with a ground.

18. The pressure-actuated rocket system according to claim 14, wherein the bottom base is filled with water.

19. The pressure-actuated rocket system according to claim 14, wherein the bottom base is filled with quartz sands.

20. The pressure-actuated rocket system according to claim 14, wherein the rocket body is made from a PET bottle.

21. The pressure-actuated rocket system according to claim 14, wherein the bottom base is made from a PET bottle.

22. The pressure-actuated rocket system according to claim 14, wherein the through hole of the top base of the bottom base penetrates two sides of the top base.

* * * * *